US008340948B1

(12) United States Patent
Song et al.

(10) Patent No.: US 8,340,948 B1
(45) Date of Patent: Dec. 25, 2012

(54) FLEET PERFORMANCE OPTIMIZATION TOOL FOR AIRCRAFT HEALTH MANAGEMENT

(75) Inventors: Shuguang Song, Seattle, WA (US); Peter James Lake, Auburn, WA (US); Jay Kevin McCullough, Belleville, IL (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 12/569,545

(22) Filed: Sep. 29, 2009

(51) Int. Cl.
*G06G 7/48* (2006.01)
(52) U.S. Cl. .......................................................... 703/6
(58) Field of Classification Search .................. 703/2, 6; 714/37; 702/185; 705/7, 7.28; 72/185
See application file for complete search history.

(56) References Cited

U.S. PATENT DOCUMENTS

| 2002/0174384 A1* | 11/2002 | Graichen et al. ................ 714/37 |
| 2004/0122625 A1* | 6/2004 | Nasser et al. ................. 702/185 |
| 2008/0021604 A1 | 1/2008 | Bouvier et al. |
| 2008/0154458 A1 | 6/2008 | Brandstetter et al. |
| 2008/0172268 A1* | 7/2008 | Wingenter ......................... 705/7 |
| 2010/0088075 A1* | 4/2010 | Yin et al. .......................... 703/2 |
| 2010/0262442 A1* | 10/2010 | Wingenter ......................... 705/7 |
| 2011/0099043 A1* | 4/2011 | Sharma et al. ............... 705/7.28 |

OTHER PUBLICATIONS

U.S. Appl. No. 12/115,456, filed May 5, 2008.

* cited by examiner

*Primary Examiner* — Kandasamy Thangavelu
(74) *Attorney, Agent, or Firm* — Armstrong Teasdale LLP (57) ABSTRACT

A computer-based method for simulating an overall effect of a component replacement on the reliability of a platform is described. The method includes determining a scheduled reliability for a platform based on a reliability associated with each of the removable components of the platform, selecting, via a user interface, at least one removable component of the platform for which replacement is to be simulated, determining, using a computer-based model, an effect the one or more replacements would have on the forecasted reliability for the platform, and providing a comparison of the forecasted reliability and the scheduled reliability to a user.

23 Claims, 11 Drawing Sheets

Aircraft Rankings

Predicted Aircraft Reliability Over The Next 75 Flight Hours

| Rank | Aircraft | Scheduled Reliability | Owner | Location | Flight Hours |
|---|---|---|---|---|---|
| 1 | 9241 | 92.30% | ANG | McConnell | 24833 |
| 2 | 9697 | 91.20% | AMC | Mildenhall | 30088 |
| 3 | 9240 | 90.78% | AMC | McConnell | 26598 |
| 4 | 0574 | 88.95% | AFR | Andersen | 36068 |
| 5 | 8448 | 87.24% | AMC | Andersen | 52945 |

Predicted Aircraft Reliability Over The Next 75 Flight Hours

Aircraft Rankings

| Rank | Aircraft | Scheduled Reliability | Owner | Location | Flight Hours |
|---|---|---|---|---|---|
| 1 | 9241 | 92.30% | ANG | McConnell | 24833 |
| 2 | 9697 | 91.20% | AMC | Mildenhall | 30088 |
| 3 | 9240 | 90.78% | AMC | McConnell | 26598 |
| 4 | 0574 | 88.95% | AFR | Andersen | 36068 |
| 5 | 8448 | 87.24% | AMC | Andersen | 52945 |

FIG. 6

Selected Aircraft

Aircraft: 8448

Operational Readiness: ▮▮▮▮▮▯

Component Reliability Graphs: Min/Max Removal  Min/Max SI  Removal Probability  SI Probability

| | | Component Info | | Probability within 75 Flt Hrs | | | |
|---|---|---|---|---|---|---|---|
| | WUC/REF DES | Description | Last Replaced | Sched Interrupt | Removal | Impact | REPL |
| 1 | 3245598011 | WHEEL, MLG | 🔋 52888 | 0.57% | 29.82% | ● | ☑ |
| 2 | 2412188031 | DRIVE, INTGD GENTR/CNSTN SPEED... | 🔋 52079 | 0.45% | 2.80% | ● | ☑ |
| 3 | 2432104011 | CHRGR, DC GENTN BATT | 🔋 39598 | 0.40% | 2.53% | ● | ☑ |
| 4 | 2702340171 | MODUL, FLAP/SLAT ELTRN UNIT (F... | 🔋 32484 | 0.36% | 1.62% | ○ | ☑ |
| 5 | 3611576271 | VALVE, PNEU BLEED AIR SYS ISOL... | 🔋 40836 | 0.31% | 1.51% | ● | ☑ |
| 6 | 3611576281 | VALVE, HIGH STAGE BLEED AIR S/... | 🔋 52868 | 0.26% | 3.02% | ● | ☑ |
| 7 | 7321144021 | CNTLR, ELTRN ENG CONT (ECU/EEC... | 🔋 28392 | 0.25% | 2.01% | ● | ☑ |
| 8 | 3427665011 | REF/U, IRS INTRL (IRU) | 🔋 50734 | 0.25% | 2.87% | ● | ☑ |
| 9 | 3241072011 | BRAKE, MLG HYD ACTUD | 🔋 52820 | 0.24% | 7.26% | ● | ☑ |
| 10 | 2432042021 | BATT, DC GENTN NICAD | 🔋 52926 | 0.23% | 7.71% | ● | ☑ |
| 11 | 5612600041 | WINDO, FLGHT COMPT NBR 2 SLDNG... | 🔋 42517 | 0.22% | 1.01% | ○ | ☑ |

Expand Component Table

[Unmark Replacements] [Simulate Replacements]

FIG. 7

Predicted Aircraft Reliability Over The Next 75 Flight Hours (With Simulated Part Replacements)

Aircraft Rankings

| Rank | Aircraft | Forecasted Reliability | Scheduled Reliability | Owner | Location | Flight Hours |
|---|---|---|---|---|---|---|
| 1 | 9241 | 92.30% | 92.30% | ANG | McConnell | 24833 |
| 2 | 9697 | 91.20% | 91.20% | AMC | Mildenhall | 30088 |
| 3 (SIM) | 8448 | 90.79% | 87.24% | AMC | Andersen | 52945 |
| 4 | 9240 | 90.78% | 90.78% | AMC | McConnell | 26598 |
| 5 | 0574 | 88.95% | 88.95% | AFR | Andersen | 36068 |

FLEET PERFORMANCE OPTIMIZATION TOOL FOR AIRCRAFT HEALTH MANAGEMENT

BACKGROUND

The field of the invention relates generally to, aircraft health management, and more specifically, to a fleet performance optimization tool that illustrates the overall effect on an aircraft fleet's health when one or more component replacements are simulated.

Expensive mechanical assets, such as commercial or military aircraft, utilize scheduled maintenance to maintain an acceptable level of reliability and performance. Scheduling and planning of maintenance activities has traditionally been based on analysis of the original vehicle design, lessons learned during subsequent operation of the vehicle, and lessons learned during the maintenance activities.

At least some components of these expensive mechanical assets are replaced at specified intervals, the intervals being defined based on data, such as reliability data, with the intent being to replace the specific component before it is due to fail. Replacing a working component on a complex machine, as a precautionary measure, is a preventive maintenance practice that is either mandated, suggested by the manufacturer, or deemed to be a good business decision. Reliability data, such as the rate of component failure or removal (i.e. mean time between unscheduled removal—MTBUR) is used to substantiate these activities.

The main disadvantage to existing solutions is that they are ad-hoc in nature, use inadequate, and somewhat random, metrics such as MTBUR, and do not quantify the total system health of a vehicle. As such, no scheduled maintenance practice has been established that eliminates all the possible scenarios that relate to reliability and performance. Advanced reliability analysis techniques are needed to better optimize preventive maintenance intervals.

BRIEF DESCRIPTION

In one aspect, a computer-based method for simulating an overall effect of a component replacement on the reliability of a platform is provided. The method includes determining a scheduled reliability for a platform based on a reliability associated with each of the removable components of the platform, selecting, via a user interface, at least one removable component of the platform for which replacement is to be simulated, determining, using a computer-based model, an effect the one or more replacements would have on the forecasted reliability for the platform, and providing a comparison of the forecasted reliability and the scheduled reliability to a user.

In another aspect, a computer program product for simulation of fleet performance is provided. The computer program product includes a computer usable medium having computer readable program code thereon. The computer readable program code includes computer readable program code for generating a list of platforms ranked according to a scheduled reliability, computer readable program code for generating and displaying a list of removable components for a platform selected from the list of platforms, computer readable program code for receiving user selection of the removable components from the list for which replacement is to be simulated, computer readable program code for determining a forecasted reliability for the selected platform based on a simulated replacement of removable components selected by the user, and computer readable program code for generating a list of platforms ranked according to the determined forecasted reliability.

In still another aspect, a system for simulating an overall effect of a component replacement on the reliability of a platform within a fleet of platforms is provided. The system includes a maintenance data database comprising maintenance data for the fleet of platforms including component failure and event data, component life cycle data, and data availability dates for each platform of the fleet and at least one computer communicatively coupled to said maintenance data database One of the computers is programmed to determine a scheduled reliability for the platform based on a reliability associated with each of the removable components of the platform, receive a user selection, via a user interface, at least one removable component of the platform for which replacement is to be simulated, determine, using a computer-based model, an effect the one or more replacements would have on the forecasted reliability for the platform, and provide a comparison of the forecasted reliability and the scheduled reliability to a user.

The features, functions, and advantages that have been discussed can be achieved independently in various embodiments of the present invention or may be combined in yet other embodiments further details of which can be seen with reference to the following description and drawings.

DETAILED DESCRIPTION

The systems and methods described herein relate to an enhancement of an existing fleet performance optimization tool (FPOT), which includes a function that illustrates the overall effect on vehicle health for a fleet of vehicles when component replacements within the vehicles are simulated. The described enhancement allows the user to simulate the replacement of a component, and then reassess the overall health of the vehicle.

One purpose of FPOT described herein is to determine the vehicle (e.g., aircraft) with the highest rate of mission readiness. To make such a determination, the FPOT performs an analysis on every component installed in a given vehicle type, calculates the inherent reliability of each component over its lifespan, identifies the last replacement for each component on each vehicle in the data set, and forecasts the probability of future component removals.

The cumulative results are then used to rank the vehicles. One problem solved by the described embodiments, is how the complexity of the analysis is broken up into manageable steps to allow the assessment to be executed, for example, by a Java application. The analysis steps begin after the FPOT queries a maintenance database and populates tables in a database for each analysis grouping (e.g., fleet, series, and engine type). The three tables used in one embodiment of the step analysis process are: component failure and event data, life cycle data (e.g., flight hours and landings), and data availability.

A statistical module reads in the data from the three tables and correlates the component removal event with the life cycle data, then uses the data availability date to determine which data is "right censored". For example, a hydraulic pump was removed from a particular aircraft on Jun. 1, 2009. The aircraft was built in February 2005, but component removal data was only available since June 2006. A statistical engine calculates the lifetime of the component (cumulated flight hours or landings) based on when data became available and the component removal date. The "right censored" lifetime for the new pump would then be calculated from the removal date, Jun. 1, 2009, to the date of the latest data input (data availability).

The result is a method for predicting the reliability of every component for a given fleet of vehicles and determining a ranking for the vehicles based on a degree of operational readiness, for example, the highest degree of operational readiness. In addition, the method features autonomous data validation and calibration steps that ensure forecast accuracy as new data is accumulated. An analysis module which executes the above described steps processes component removal data in steps while formatting maintenance data. The analysis module also performs a statistical and stochastic analysis, validates the result set, and recalibrates the model, if recalibration is needed.

Figure 1:
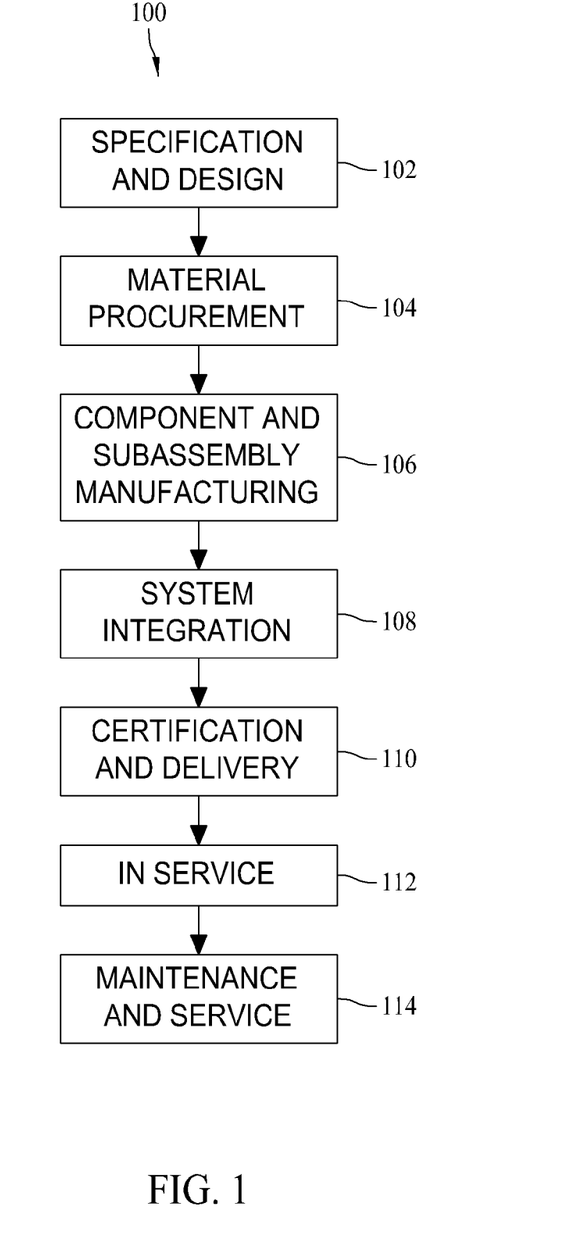
FIG. 1 is a flow diagram of an aircraft production and service methodology.
Figure 2:
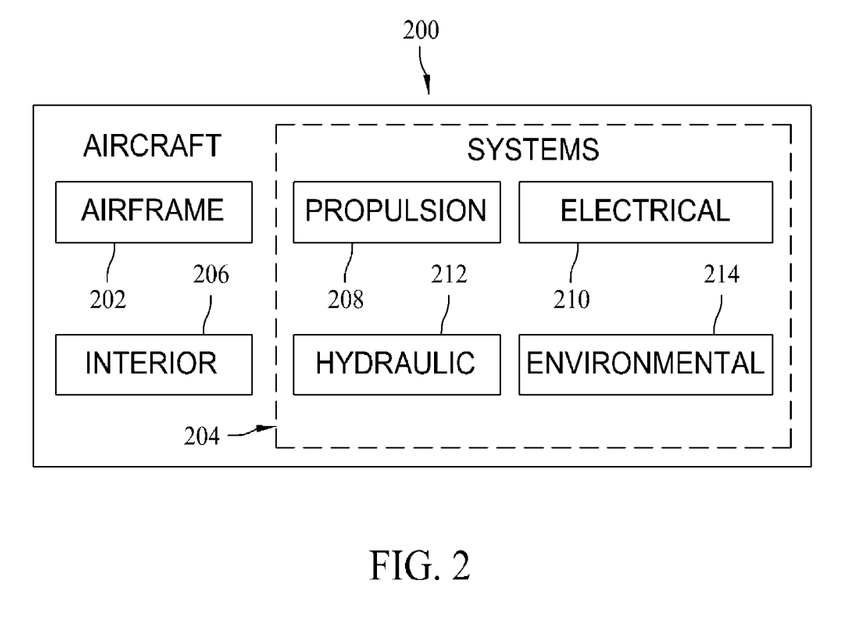
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
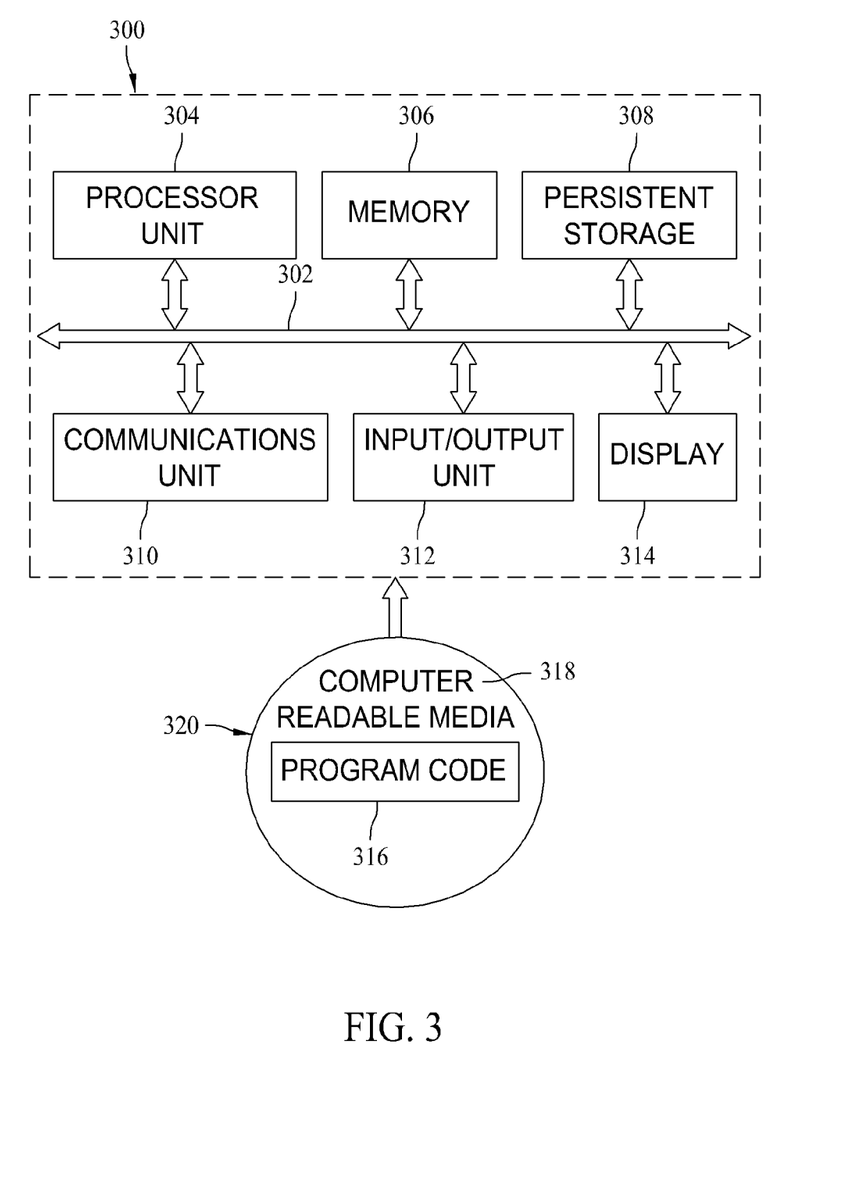
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system is operable for running the fleet performance optimization tool (FPOT) and through FPOT, modeling the statistical reliability of every component that can be removed, for a given fleet of vehicles (e.g., platforms). The tool is further operable to determine the relative probability of the next needed replacement (for every component that is currently installed). In one embodiment, the FPOT system is programmed to incorporate a component replacement simulation function. This simulation function illustrates, as further described below, the effect that replacement of a component will have on vehicle operational readiness.

In one embodiment, the described FPOT component replacement simulation function is part of an integrated application that not only reports past removal rates, but also predicts future removals and their impact on operational readiness. Such a solution addresses one of the main disadvantages of existing solutions in that those solutions are ad-hoc in nature and do not quantify the total system health of a vehicle. Instead, the FPOT component replacement simulation function is part of an integrated suite of tools that allow a user to identify a candidate for preventive maintenance and gauge the effect of a component replacement on a given vehicle using an advanced statistical model.

FIGS. 4-9 are a series of user interface displays that may be displayed on display 314 of system 300 during utilization of the FPOT simulation tool described herein. The FPOT component replacement simulation tool ranks a given fleet of aircraft (or other vehicle types) by a predicted level of mission readiness, for example, the highest predicted level of mission readiness. The simulation feature described herein allows a user to explore preventative maintenance options and their corresponding effectiveness on operational readiness.

Figure 4:
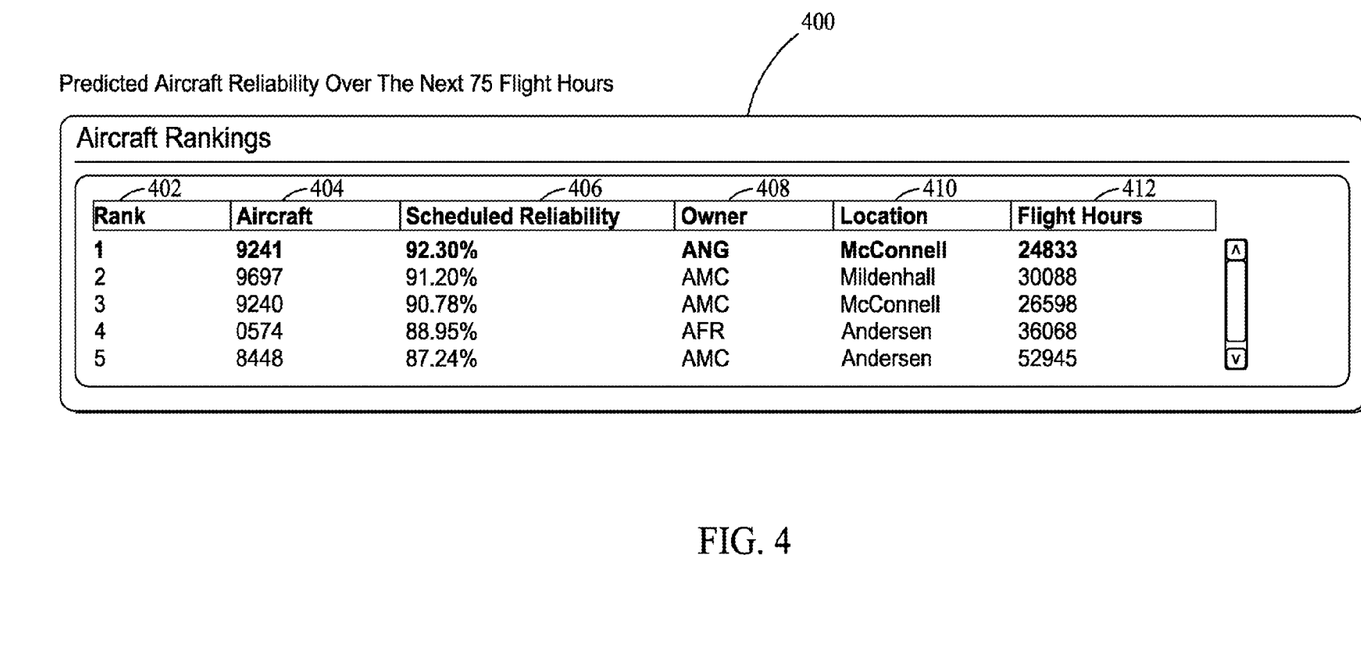
FIG. 4 is a user interface display of several vehicles ranked by a scheduled reliability.

FIG. 4 is a user interface display 400 of scheduled aircraft reliability over, for example, the next 75 flight hours. The display is in the form of rankings 402. In the illustrated embodiment, the aircraft are ranked one through five, with the aircraft serial numbers 404 shown. Also shown is a scheduled reliability 406 for each aircraft, an owner 408 for each aircraft, an aircraft location 410 for each of the aircraft, and the flight hours 412 for each of the aircraft. As can be seen from FIG. 4, the aircraft rankings 402 are based on the scheduled reliability 406 for the aircraft. Specifically, the aircraft with the highest scheduled reliability 406 is ranked first, and the aircraft with the lowest scheduled reliability 406 is ranked fifth. Also shown in FIG. 4 is that the aircraft "9241", with the highest scheduled reliability 406, has been selected by a user, since the text associated with this aircraft is bolded.

Figure 5:
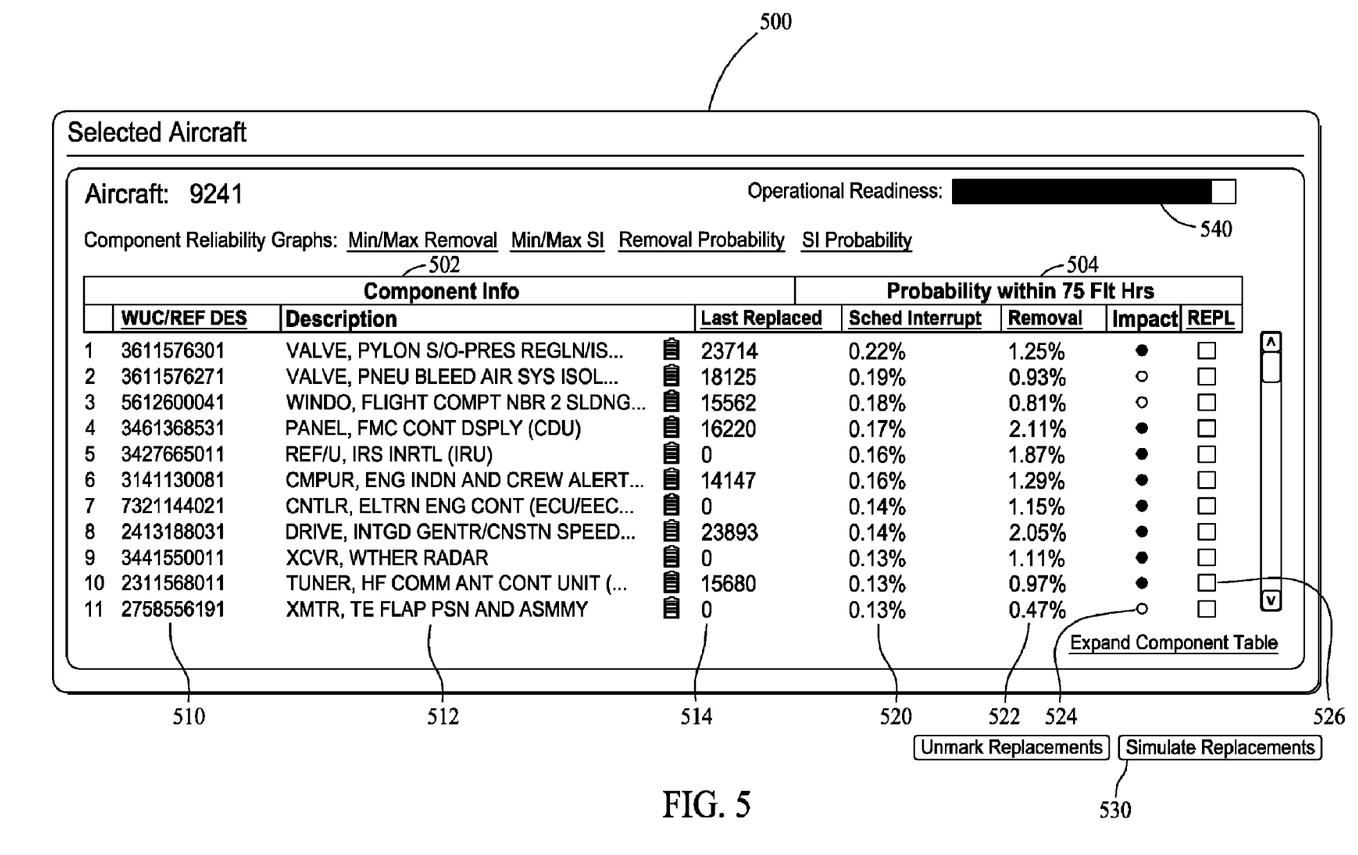
FIG. 5 is a user interface display of replaceable components for a vehicle.

Turning to FIG. 5, it is a user interface display 500 of replaceable components for aircraft "9241", which is displayed after selection via user interface display 400 (shown in FIG. 4). User interface display 500 includes information for aircraft "9241" that can generally be divided into two categories: component information 502 and probability information 504 for the next 75 flight hours. It should be noted that the 75 flight hours is but one value that could be used in the probability determinations. The component information 502 includes component numbers 510, descriptions 512, and the flight hours 514 when the component was last replaced. The probability information 504 includes a probability 520, in percentage, that a scheduled interruption, for example, a replacement of the component will occur within the next 75 flight hours, a probability 522 of the part being removed from the aircraft within the next 75 flight hours, an impact 524 that replacement of the component will have on operation readiness, and component replacement selection boxes 526 for each listed component. An operational readiness bar graph 540 which is "filled in" to contain the scheduled reliability percentage for the selected aircraft, in the case of FIGS. 4 and 5, this percentage is 92.30%.

In the illustrated embodiment, the impact 524 of component replacement is shown as an indicator. In this embodiment, the indicator may be red, yellow, or green. For example, a green indication may mean the aircraft has a high level of mission readiness (less than 10% probability of a component causing a schedule interruption). A yellow indication may mean a degraded mission readiness (20-30% probability of a schedule interruption), and a red indication may mean an unacceptable level of mission readiness (greater than 30% probability a schedule interruption will occur). In use, the user selects one or more of the selection boxes 526 and selects a "simulate replacements" radio button 530 to begin the simulated component replacement. The Min/Max removal, Min/Max SI, Removal Probability, and SI Probability links shown in the illustrated embodiment are links to graphs that illustrate probability distributions over time.

Figure 6:
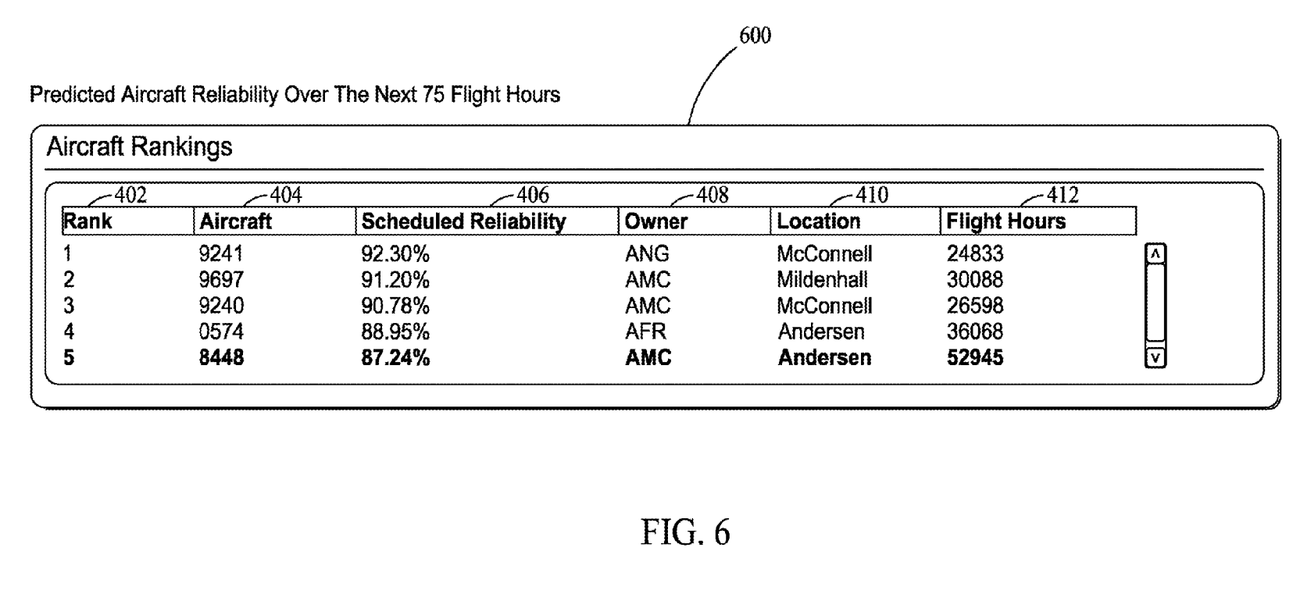
FIG. 6 is a user interface display of several vehicles ranked by a scheduled reliability.
Figure 7:
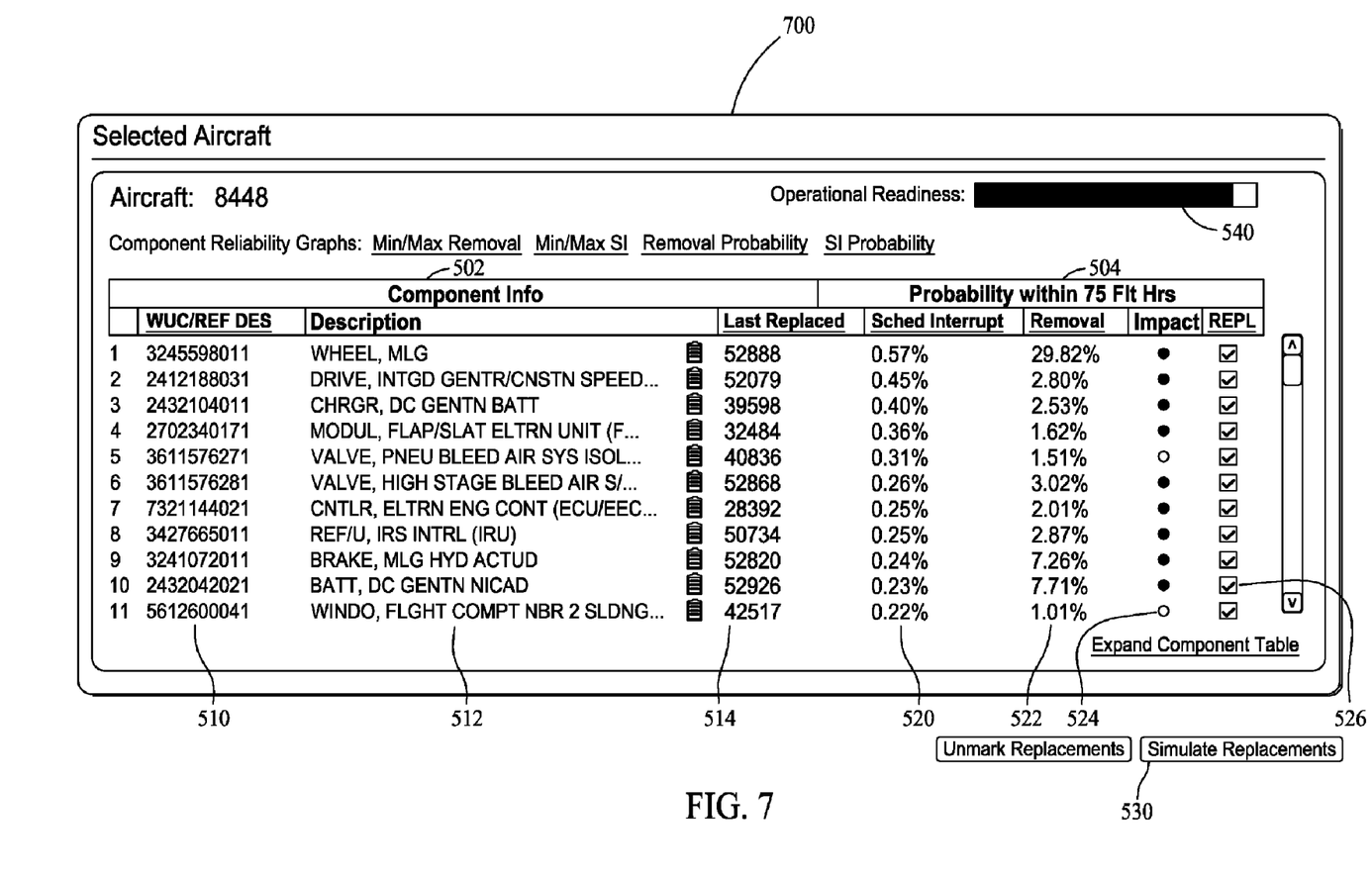
FIG. 7 is a user interface display of replaceable components for a vehicle with multiple components selected for simulated replacement.

FIGS. 6 and 7 illustrate user interface displays 600 and 700 that are similar to respective user interface displays 400 and 500. In user interface display 600, the aircraft with the fifth best (or worst) scheduled reliability 406 (aircraft "8448") has been selected and its replaceable components are listed in user interface display 700. In user interface display 700, the selection boxes 526 for a number of the components of aircraft "8448" have been selected for replacement simulation, and the removal impact 524 for each of these components is shown in one of "red", "yellow", and "green".

Figure 8:
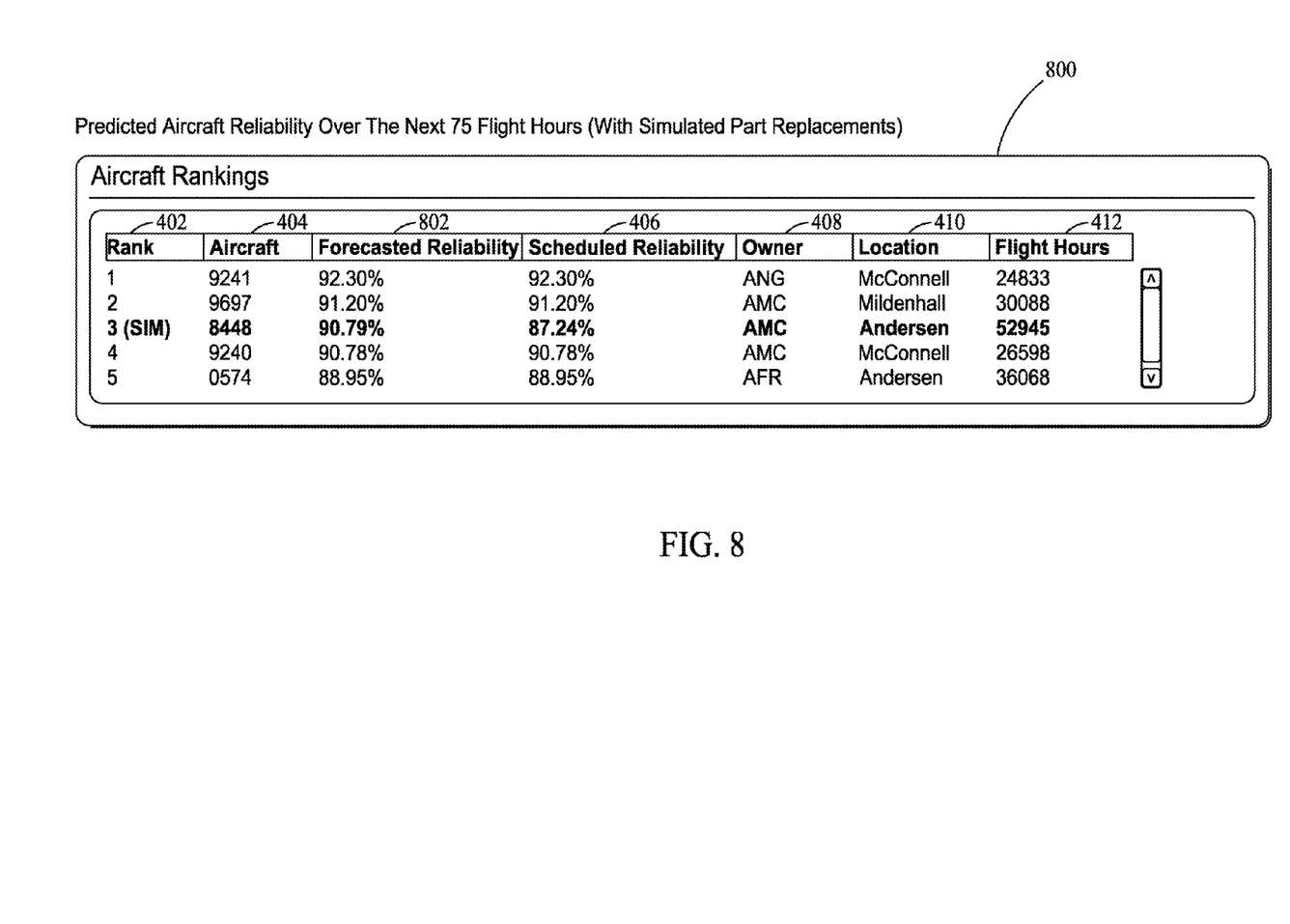
FIG. 8 is a user interface display of several vehicles ranked by a forecasted reliability after executing a component replacement simulation.
Figure 9:
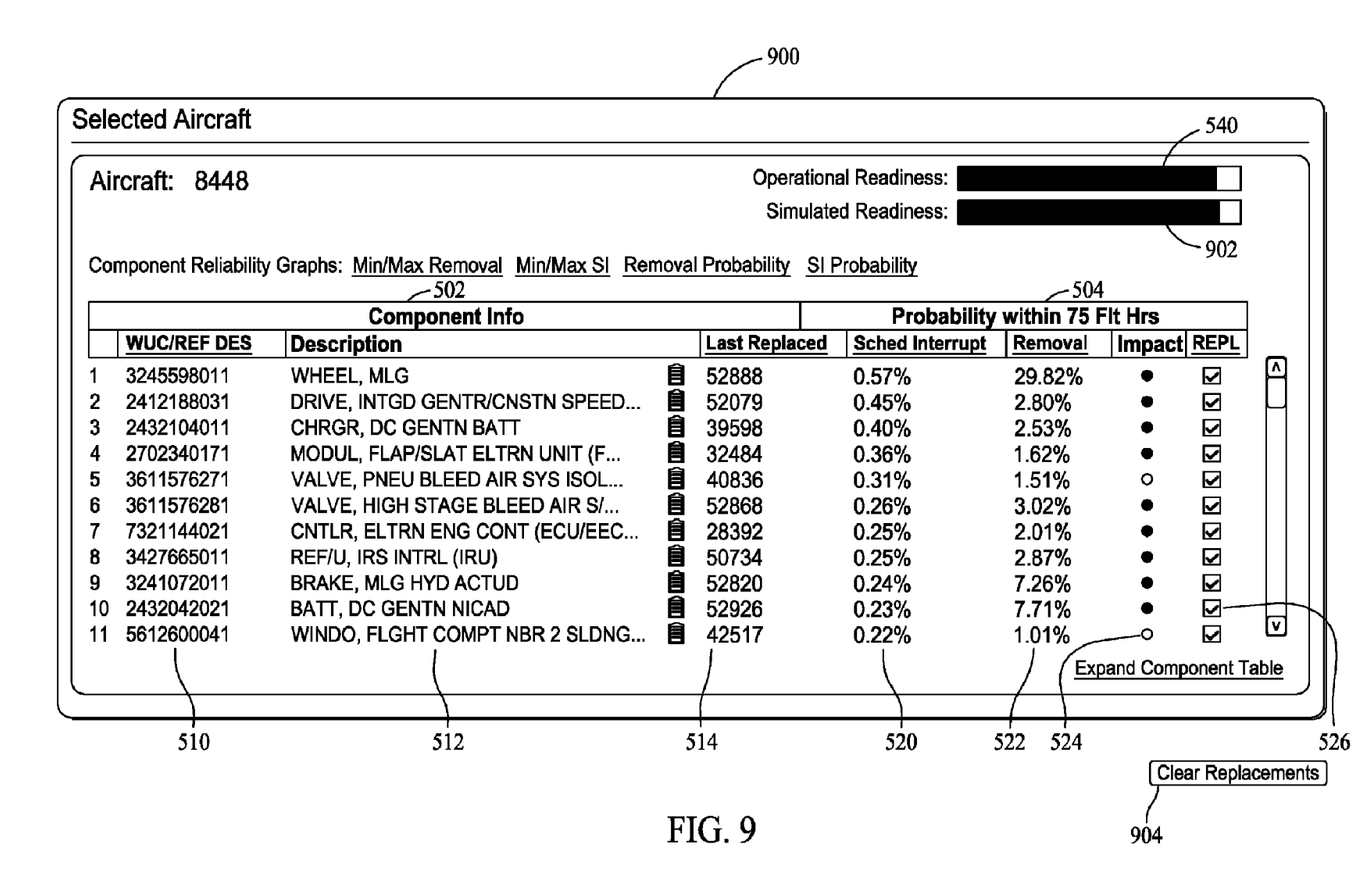
FIG. 9 is a user interface display of replaceable components for a vehicle showing a simulated readiness for a vehicle after a component replacement simulation.

FIG. 8 is a user interface display 800 provided to the user of system 300 after the simulation defined by the user interface display 700 of FIG. 7 has been run. It should be noted that aircraft "8448" has moved from being the fifth most reliable (as shown in FIGS. 4 and 6) to being the third most reliable, based on the simulated replacement of the selected components. It should be noted that user interface display 800 includes a forecasted reliability 802 column for the five aircraft which can be compared to the scheduled reliability 406. The reliability for aircraft "8448" has increased from a scheduled reliability of 87.24% to a forecasted reliability of 90.79% due the simulated replacement of selected components. FIG. 9 is a user interface display 900 that is similar to user interface display 700 except that in addition to the operational readiness bar graph 502, a simulated readiness bar graph 902 is also displayed. A clear simulation button 904 allows a user to start over, for example, at user interface displays 400 or 600 for the selection of another simulation, perhaps for another of the five aircraft listed. A user may also be provided with user interfaces that allow him or her to select different aircraft for the simulated component replacements described above.

Figure 10:
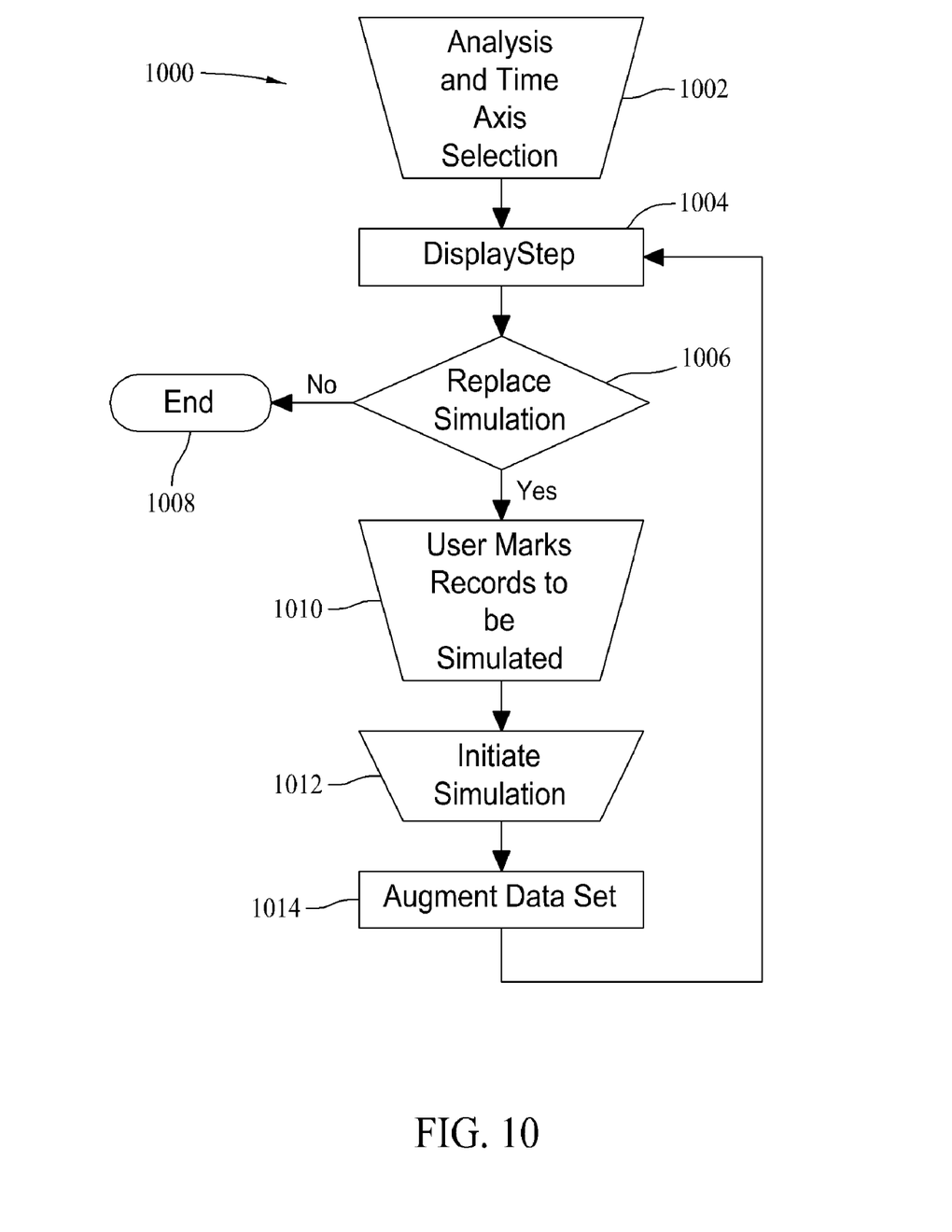
FIG. 10 is a flowchart illustrating a component replacement simulation process.

FIG. 10 is a flowchart 1000 that illustrates the method for simulating component replacements embodied in the user interface displays of FIGS. 4-9. At an analysis and time axis selection step, a group of vehicles are selected 1002 for comparison, along with a time period for such a comparison. An example is predicting the reliability of a selected group of vehicles over the next 75 service hours. The scheduled reliability 406 and other information for the selected vehicles is then displayed 1004. An example of such a display is FIG. 4. When the first simulation is being done, a replace simulation query 1006 is not shown, or the query 1006 is answered in the affirmative. If the user answers in the negative (generally after one or more simulations have been run), the process ends 1008.

Next, the user marks 1010, or selects, records to be used in the component replacement simulation. As is easily understood, the records correspond to components for which replacement can be simulated. Record selection is illustrated in FIG. 7 through checking of selection boxes 526. The simulation is then initiated 1012, and the data set is augmented 1014 with the forecasted reliability 802 shown in FIG. 8 (including any change in vehicle reliability with respect to the other vehicles as also shown in FIG. 8) and the simulated readiness 902 shown in FIG. 9, which are then displayed at 1004. The user can utilize the results of the simulation at this point, or may choose to commence another simulation by selecting other/additional/fewer components for simulated replacement.

Figure 11:
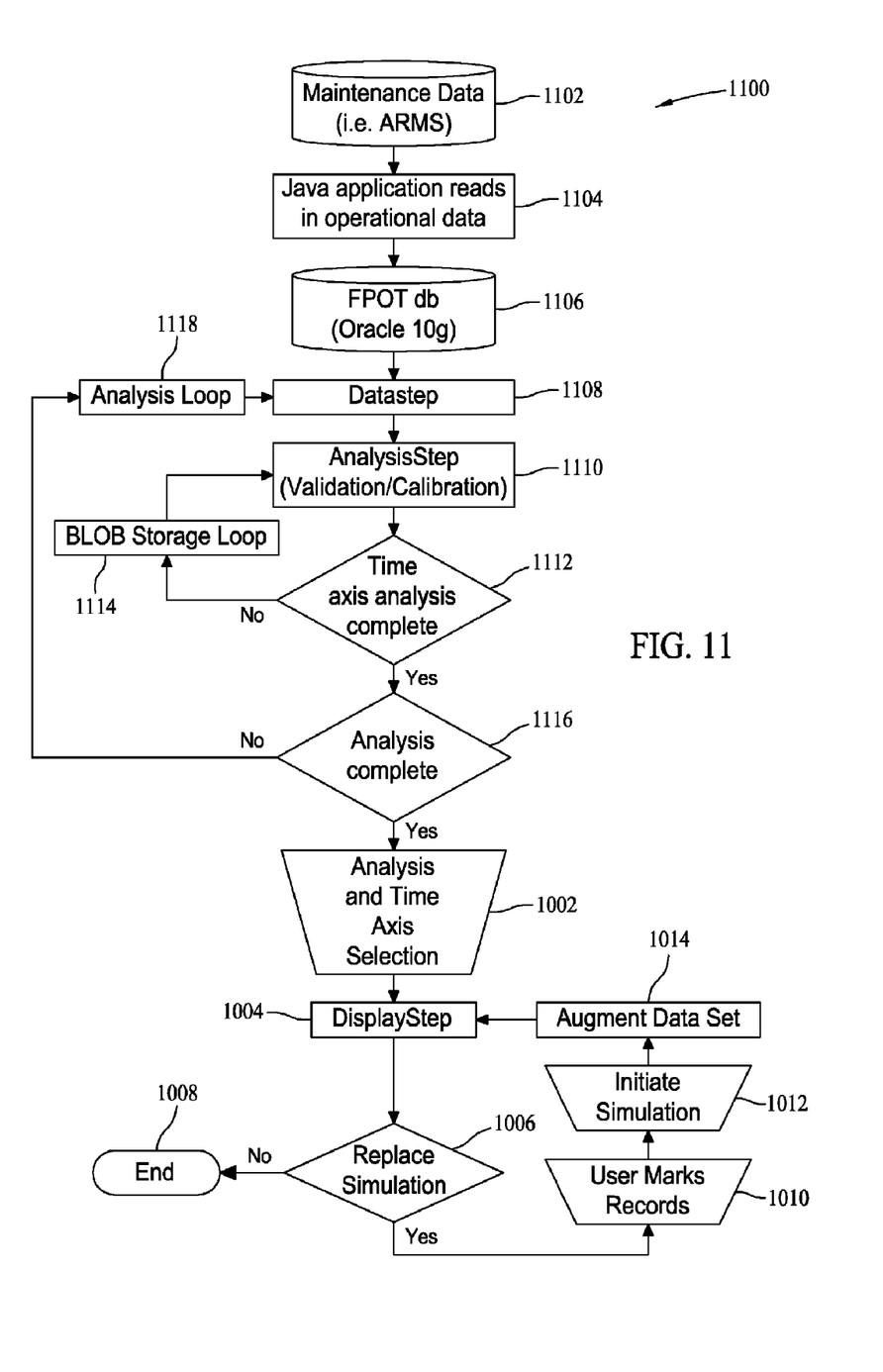
FIG. 11 is a flowchart which illustrates utilization of actual component replacement data in a simulated component replacement process.

FIG. 11 is a flowchart that illustrates the component simulation process in terms of the databases which form a portion of system 300 and within which maintenance data and the like for a fleet of vehicles and their individual components is maintained. As shown in flowchart 1100, a maintenance data database 1102 provides the actual reliability and actual replacement data for the components associated with a fleet of vehicles.

In one embodiment, an application reads 1104 in operational data from the database 1102, for example, when specific components were replaced within a particular vehicle. Since one purpose of the fleet performance optimization tool is to determine the vehicles with the highest rate of mission readiness, FPOT performs an analysis on every component installed in a given vehicle type, calculates the inherent reliability for each component, identifies the last replacement of each component on each airplane in the data set, and forecasts the probability of future component removals.

The cumulative results are then used to rank the vehicles. The complexity of the analysis requires the analysis to be broken up into steps which are executed by application 1104, which in one embodiment is a Java application. In one embodiment, the analysis steps automatically begin after FPOT queries maintenance data database 1102 and populates tables, for example within a fleet performance optimization tool (FPOT) database 1106, which in one embodiment is a maintenance database, for each analysis. In the analysis, item are grouped in groups such as fleet, series, and engine type. The three tables used in the step analysis process are component failure and event data, life cycle data (flight hours and landings), and data availability forming three input files.

The actual operational data (i.e., component failure and event data, life cycle data, and data availability) is utilized to populate the FPOT database 1106. As described elsewhere herein, the FPOT database 1106 and the FPOT application are utilized to model the component reliability of every component replacement for a given fleet of vehicles and then determine the relative probability of the next need for replacement (for every component currently installed). The described embodiments incorporate a component replacement simulation that illustrates the effect of component replacement on aircraft operational readiness.

Continuing with FIG. 11, after population of the FPOT database 1106, a datastep 1108 compiles the three input files into one record set that contains both event data and operational data (flight hours and landings). In the datastep 1108, three input files are placed into a directory. The statistical module reads in the three input files and correlates the component removal event with the life cycle data then uses the data availability date to determine which data is "right censored". In one embodiment, the Java application executes a command line that initiates the statistical analysis module (AnalysisStep 1110), which in one embodiment is run in the (R environment), then "waits" for the first output file to be generated.

In one embodiment, AnalysisStep 1110 consists of four parts. Continuing with the aircraft example, the first part includes for each aircraft, estimate the probability of each component to need to be replaced based on the current cumulative flight hours (or number of aircraft landings). The second part includes, for each aircraft, estimate the probability that a schedule interruption will be caused by each component. The third part includes, for each aircraft, estimate the probability of the next component replacement (which could be any component). The fourth part includes, for each aircraft, estimate the probability of the next schedule interruption that is caused by any component. The output file is a data set that represents the lifetime of every component installed on every aircraft in a given fleet group.

Upon completion of the output file, the Java application initiates the second step which loops through two analysis sessions. The first analysis populates the input argument, for example, with the specific aircraft fleet and operator to be analyzed, and identifies the time axis as flight hours. The AnalysisStep 1110 uses the Power Law Process to predict the next component removal occurrence on each aircraft and the Compound Poisson Process to determine the probability of a schedule interruption, for example, a delay or a cancellation, based on the component operated flight hours. Another output file, the countdat file, is generated, once the time axis analysis step 1112 is complete and stored as a Binary Large Object (BLOB) 1114.

All the data needed to generate FPOT analysis results including aircraft serial number, component identification number, total flight hours and landings, flight hours and landings since last replacement, reliability shape and scale parameters (alpha, beta, sip, lambda, sigma, mu) are included in the countdat file. At this point, when the user selects a group of aircraft, the FPOT application only needs to access the countdat file to compare aircraft, all the reliability analysis is already completed.

Once the BLOB is generated 1114, the Java application determines if the analysis is complete 1116, and if not, initiates a second analysis session 1118 based on the amount of landings on the aircraft (time axis=landings) and stores the results in a second BLOB 1114 after rerunning AnalysisStep 1110. In one embodiment, the second BLOB 1114 includes the same data as the first BLOB 1114 except that except the statistical analysis is based on the time axis being equal to the number of landings instead of the time axis being equal to the number of flight hours as it is in the first BLOB 1114.

A data validation/calibration function is within the AnalysisStep 1110 module which validates the results of the AnalysisStep 1110 and calibrates the model to enable a more accurate prediction.

In one embodiment, the Java application then loops back to the data pull and starts the process over until a countdat file (BLOB 1114) exists for every fleet grouping (fleet/series/engine type) designated by the application administrator. This portion of the Java application is run automatically, for example, on a nightly basis.

The remainder of flowchart 1100 is the same as flowchart 1000 (shown in FIG. 10). When a user begins an analysis session the Java application calls up the preprocessed reliability data generated in the earlier steps and initiates the final statistical analysis process of the R code, the Displaystep 1004. The user inputs (analysis and time axis selection 1002) identify the specific aircraft to be analyzed and the Java application calls up the statistical module which generates the analysis report and graphs. The Java application then reads in the output and displays the results in Display step 1104.

The problems solved by the described embodiments include taking a large complex data set and developing a meaningful analysis that can be accessed by a user very quickly. In addition, a key attribute is that the embodiments are flexible enough to be executed on various IT platforms (i.e. Windows, Unix, and Linux). In order to accomplish this task, a series of steps were developed to integrate the web based Java application, Oracle 10 g database, and the statistical analysis R language. Some of these steps are accomplished through processes which analyze a specific grouping of data, then loops back to the next grouping until all the data sets are stored. The final step, the display step, takes the preprocessed analysis metrics and develops a prediction for future component removals, and or scheduled interruptions, within seconds after the user command.

In one embodiment, the component replacement simulation function is embedded in the FPOT application, which includes a user interface as described above. The steps for simulating a component replacement are simply determining which vehicle would benefit from a component replacement, checking the appropriate dialogue box associated with one or more components, and then selecting, for example, a "simulate replacements" button. This user action causes the simulation model to execute, and provide a user with the results of the simulation in user interface form, as described herein.

The simulation of a component replacement function utilizes the predicted reliability generated through the FPOT analysis to establish the net health impact of performing a preventative maintenance action. Specifically, if a component was identified to have a high probability of need of replacement, the FPOT user can select to simulate the replacement of that component. The statistical model then assumes that a replacement has occurred on the current date and will calculate the date and the time until the next replacement of that component. The new predicted lifetime will than be rolled into an aggregate measurement of the vehicles health and displayed as a simulated value.

An easy to use, graphical user interface (GUI), shown in FIGS. 4 through 9, allows the user to experiment with various "what if" scenarios and determine the most appropriate course of action for a given operational environment. One embodiment of the FPOT is a web based application that utilizes standard enterprise assets such as Java EE and an Oracle 10 g database. The graphical user interface is written in Java and statistical processing is done in the R environment. (R is free software for statistical computing and graphics (see http://www.r-project.org/). The simulation capabilities added to FPOT, which are accomplished in the R environment, utilize input data and generate results data which is stored in Oracle 10g, and displayed in a web application written in Java.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for simulating an overall effect of a component replacement on a reliability of a platform, said method comprising:
   determining a scheduled reliability for a platform based on a predetermined reliability associated with each of a plurality of removable components of the platform;
   selecting, via a user interface, at least one removable component of the platform for which replacement is to be simulated;
   determining, using a predetermined computer-based model, an effect one or more replacements would have on a forecasted reliability for the platform; and
   providing a comparison of the forecasted reliability and the scheduled reliability to a user.

2. A computer-based method according to claim 1 wherein selecting the at least one removable component of the platform for which replacement is to be simulated comprises determining which platform in a fleet of platforms would benefit most from replacement of a component.

3. A computer-based method according to claim 1 wherein determining, using the predetermined computer-based model, comprises gauging the effect the one or more replacements would have on the forecasted reliability for the platform using a predetermined statistical model.

4. A computer-based method according to claim 1 wherein determining, using the predetermined computer-based model, comprises:
   assuming the one or more replacements occurred on a date of model activation;
   calculating a time that the at least one removable component should next be replaced; and
   using the calculated replacement time for the at least one removable component to generate an aggregate measurement of reliability for the platform.

5. A computer-based method according to claim 1 wherein determining the scheduled reliability for a platform comprises:
   modeling a statistical reliability of each of the removable components of the platform; and
   determining a relative probability of a next need for replacement for each of the removable components.

6. A computer-based method according to claim 5 wherein providing a comparison comprises reporting past removal for the removable components, predicting future component removals, and determining an impact of the future component removals on operational readiness of the platform.

7. A computer-based method according to claim 1 wherein selecting, via a user interface, at least one removable component of the platform for which replacement is to be simulated comprises:
   displaying a list of platforms ranked according to scheduled reliability;
   selecting, via the user interface, one of the displayed platforms;
   providing, at the user interface, a list of removable components for the selected platforms platform; and
   entering, via the user interface, one or more of the list of removable components for which replacement is to be simulated.

8. A computer-based method according to claim 7 further comprising selecting a platform operational time frame over which platform reliabilities are to be ranked, wherein the platform reliabilities include at least one of the scheduled reliability and the forecasted reliability.

9. A computer-based method according to claim 7 wherein providing, at the user interface, a list of removable components for the selected platform comprises:
   providing a probability, for each removable component, that the component will need to be replaced within a predefined time frame;
   providing a probability, for each removable component, that the component will be removed from the selected platform within the predefined time frame; and
   providing a measure of impact, for each removable component, that replacement of the component will have on operational readiness for the selected platform.

10. A computer-based method according to claim 7 further comprising displaying a list of platforms ranked according to the forecasted reliability, the ranking based on a simulated replacement of at least one component from each platform.

11. A computer program product comprising a non-transitory computer readable medium having computer executable instructions stored thereon, which when executed on a computer perform a method of simulating an overall effect of a component replacement on a reliability of a platform, said computer program product comprising:
   computer executable instructions for generating a list of platforms ranked according to a scheduled reliability;
   computer executable instructions for generating and displaying a list of removable components for a platform selected from the list of platforms;
   computer executable instructions for receiving a user selection of removable components for which replacement is to be simulated from the list of removable components;
   computer executable instructions for determining a forecasted reliability for the selected platform based on a simulated replacement of the removable components selected by the user; and
   computer executable instructions for generating a list of platforms ranked according to the determined forecasted reliability.

12. A computer program product according to claim 11 wherein said computer executable instructions for determining a forecasted reliability is operable to:
   model a statistical reliability of every component that is to be removed from the platform; and
   determine a relative probability of a next need for replacement for each of the removable components.

13. A computer program product according to claim 11 further comprising computer executable instructions for reporting past removal for the removable components, predicting future component removals, and determining an impact of the future component removals on operational readiness of the platform.

14. A computer program product according to claim 11 wherein said computer executable instructions for determining a forecasted reliability comprises a user Selected selection of a platform operational time frame over which platform reliabilities are ranked, wherein the platform reliabilities include at least one of the scheduled reliability and the forecasted reliability.

15. A computer program product according to claim 11 wherein further comprising computer executable instructions for:
   providing a probability, for each removable component, that the component will need to be replaced within a predefined time frame;
   providing a probability, for each removable component, that the component will be removed from the selected platform within the predefined time frame; and
   providing a measure of impact, for each removable component, that replacement of the component will have on operational readiness for the selected platform.

16. A system for simulating an overall effect of a component replacement on a reliability of a platform within a fleet of platforms, said system comprising:
   a maintenance data database comprising maintenance data for the fleet of platforms including component failure and event data, component life cycle data, and data availability dates for each platform of the fleet; and
   at least one computer communicatively coupled to said maintenance data database, said at least one computer programmed to:
   determine a scheduled reliability for the platform based on a predetermined reliability associated with each of a plurality of removable components of the platform;
   receive a user selection, via a user interface, of at least one removable component of the platform for which replacement is to be simulated;
   determine, using a predetermined computer-based model, an effect one or more replacements would have on a forecasted reliability for the platform; and
   provide a comparison of the forecasted reliability and the scheduled reliability to a user.

17. A system according to claim 16 wherein said computer is programmed to determine which platform in the fleet of platforms would benefit most from replacement of a component.

18. A system according to claim 16 wherein to determine an effect the one or more replacements would have on the forecasted reliability, said computer is programmed to:
   assume the one or more replacements occurred on a assume date of model activation;
   calculate a time that the at least one removable component should next be replaced; and
   use the calculated replacement time for the at least one removable component to generate an aggregate measurement of reliability for the platform.

19. A system according to claim 16 wherein to determine the scheduled reliability for a platform, said computer is programmed to:
   model a statistical reliability of each of the removable components of the platform; and
   determine a relative probability of a next replacement for each of the removable components.

20. A system according to claim 16 wherein to determine a scheduled reliability for a platform, said computer is programmed to report past removal for the removable components, predict future component removals, and determine an impact of the future component removals on operational readiness of the platform.

21. A system according to claim 16 wherein to receive a user selection, said computer is programmed to:
   display a list of platforms ranked according to scheduled reliability;
   receive a user selection, via the user interface, of one of the platforms;
   provide, at the user interface, a list of removable components for the selected platform; and
   receive a user selection, via the user interface, of one or more of the removable components for which replacement is to be simulated.

22. A system according to claim 21 wherein said computer is programmed to receive a user selection of a platform operational time frame over which platform reliabilities are to be ranked, wherein the platform reliabilities include at least one of the scheduled reliability and the forecasted reliability.

23. A system according to claim 21 wherein to provide, at the user interface, a list of removable components for the selected platform, said computer is programmed to:
   provide a probability, for each removable component, that the component will need replacement within a predefined time frame;
   provide a probability, for each removable component, that the component will be removed from the selected platform within the predefined time frame; and
   provide a measure of impact, for each removable component, that replacement of the component will have on operational readiness for the selected platform.

* * * * *